(12) United States Patent
Okuyama et al.

(10) Patent No.: US 6,634,755 B1
(45) Date of Patent: Oct. 21, 2003

(54) ILLUMINATING DEVICE AND PROJECTOR

(75) Inventors: Atsushi Okuyama, Tokorozawa (JP); Saburo Sugawara, Kawasaki (JP); Hiroyuki Kodama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/504,994

(22) Filed: Feb. 15, 2000

(30) Foreign Application Priority Data

Feb. 17, 1999 (JP) .......................................... 11-038218

(51) Int. Cl.⁷ ........................ G03B 21/26; G03B 21/28; G03B 21/00; G02F 1/1335; G02B 5/08
(52) U.S. Cl. ............................ 353/31; 353/34; 353/37; 353/98; 353/99; 349/5; 349/7; 349/8; 359/838
(58) Field of Search ............................ 353/31, 33, 34, 353/37, 48, 49, 98, 99, 38, 20, 50, 51; 349/7, 5, 8, 9, 24, 25, 30, 56, 57, 62, 78, 80, 113, 114, 617, 6; 359/838

(56) References Cited

U.S. PATENT DOCUMENTS

| | | | |
|---|---|---|---|
| 5,073,013 A | | 12/1991 | Sonehara et al. ............. 359/63 |
| 5,418,584 A | * | 5/1995 | Larson ........................ 353/122 |
| 5,626,409 A | | 5/1997 | Nakayama et al. |
| 5,975,703 A | * | 11/1999 | Holman et al. ................ 353/20 |
| 6,019,474 A | * | 2/2000 | Doany et al. .................. 353/33 |
| 6,036,318 A | * | 3/2000 | Itoh ............................ 353/20 |
| 6,067,128 A | * | 5/2000 | Imai .............................. 349/8 |
| 6,129,437 A | * | 10/2000 | Koga et al. ................... 353/98 |
| 2002/0171811 A1 | * | 11/2002 | Kodama et al. .............. 353/31 |

FOREIGN PATENT DOCUMENTS

| JP | 63-116123 | 5/1988 | .......... G02F/1/133 |
|---|---|---|---|
| JP | 2505758 | 4/1996 | .......... H04N/9/31 |

\* cited by examiner

Primary Examiner—Russell Adams
Assistant Examiner—Melissa J. Koval
(74) Attorney, Agent, or Firm—Morgan & Finnegan, L.L.P.

(57) ABSTRACT

In an illuminating device in which a light from a light source is separated into three color lights differing in optical path from one another by a color separating system, and light modulating elements conforming to the respective color lights are illuminated with the color lights, at least one of the optical paths of the three color lights has therein a reflecting system having positive power for reflecting the color light passing therethrough.

23 Claims, 9 Drawing Sheets

ILLUMINATING DEVICE AND PROJECTOR

BACKGROUND OF THE INVENTION

1. Field of the Invention

This invention relates to an illuminating device and a projector using the same, and is suitable for a color liquid crystal projector for enlarging and projecting, for example, images of three colors displayed on three liquid crystal panels onto a screen.

2. Related Background Art

There have heretofore been proposed various liquid crystal projectors for enlarging and projecting an image made by a liquid crystal light valve or the like onto a screen.

In the projector of this kind, three image display elements are illuminated with three color lights R, G and B obtained by color-separating a light from a light source, and images of three colors R, G and B are displayed by these three image display elements. The images (color lights) by the image display elements are color-combined and are projected onto a screen or the like by a projection lens.

When in this construction, a cross dichroic prism of a construction in which surfaces having dichroic film intersect with each other is used for color combination, there is a case where one of optical path lengths of three color lights for illumination from the light source to the image display elements is longer than the other two optical path lengths or a case where two optical path lengths are longer than remaining one optical path length.

In a projector disclosed in Japanese Laid-Open Patent Application No. 63-116123, an optical path bending plane mirror is provided in the longest one of optical paths of lights of three colors. This is often used in a construction for directing the light from a light source directly to an image display element.

In this case, there has been the problem that in the longest optical path, the light diverges and the utilization efficiency of light is reduced relative to the other short optical paths. Against such a problem, U.S. Pat. No. 5,626,409 discloses a construction as shown in FIG. 9 of the accompanying drawings wherein an illuminating system for illuminating an image display element is provided with a so-called integrator 103 comprising a lens array constructed into the form of a matrix, and a relay system comprising a convex lens and a plane mirror is provided to produce a uniform illuminating area so that a first uniform illuminating area produced in an optical path by the integrator 103 and the image display element may be made conjugate with an optical path longer than the other optical paths in a color separating system.

Figure 9:
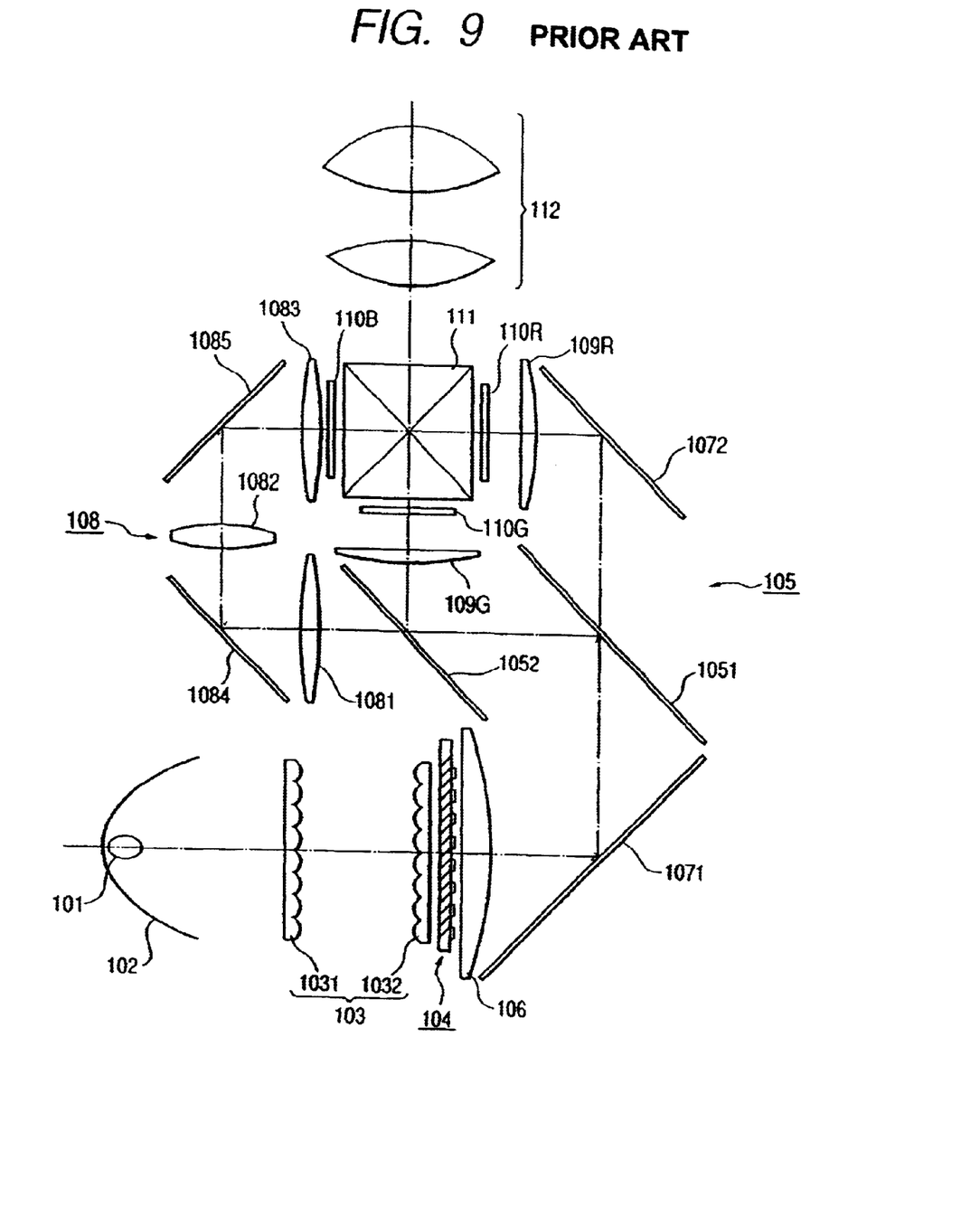
FIG. 9 is a schematic view of the essential portions of an image display apparatus according to the prior art.

In FIG. 9, the reference numeral 101 designates a light source such as a metal halide lamp or a mercury lamp. The reference numeral 102 denotes a reflector having a reflecting surface comprising a parabolic surface or an elliptical surface. The reference numeral 103 designates an integrator comprising a first lens array 1031 and a second lens array 1032.

The reference numeral 104 denotes a polarization converting element which converts a non-polarized incident light into a predetermined linearly polarized light and emits it. The reference numeral 105 designates a color separating system comprising dichroic mirrors 1051 and 1052. The reference numerals 1071 and 1072 denote mirrors. The reference numeral 108 designates a relay system having lenses 1081, 1082 and 1083 and mirrors 1084 and 1085.

The reference characters 110R, 110G and 110B denote image display elements for colors R, G and B comprising liquid crystal panels (light valves). The reference numeral 111 designates a cross dichroic prism. The reference numeral 112 denotes a projection lens having positive refractive power and for enlarging and projecting images displayed by the image display elements 110R, 110G and 110B.

The reference numeral 106 designates a condensing lens for condensing the diffused light from the polarization converting element 104 onto the image display elements 110R, 110G and 110B. The reference characters 109G and 109R denote condenser lenses for condensing the illuminating light onto the projection lens, and the lens 1081 of the relay system 108 also has the same role as that of these condenser lenses.

In recent years, in projectors such as color liquid crystal projectors, the downsizing thereof has been desired, and an illuminating optical system for illuminating an image display element has also been downsized. In the case of the color projector as shown in FIG. 9, it is effective for the downsizing of the illuminating system to shorten the longest relay optical path (B optical path) of the optical paths of three color lights.

However, to shorten the optical path of the relay system 108 while maintaining the conjugate relation between the uniform illuminating area formed in the optical path of R and the image display element, the refractive power (positive) of the lenses 1081 and 1082 constituting the relay system 108 must be strong.

The relay system 108 is such that the second relay lens 1082 for adjusting at least the conjugate relation is provided in the central portion of the relay system, the first relay lens 1081 for producing a plurality of light source images produced near the first uniform illuminating area by the lens array 103 near the second relay lens is provided near the uniform illuminating area, the third relay lens 1083 working as a condenser lens for the projection lens in the relay system is provided near the image display element, and the two plane mirrors 1084 and 1085 for bending the optical path are provided between the relay lenses.

Strengthening the refractive power of a lens to shorten the optical path is strengthening the refractive power of the first, second and third relay lenses 1081, 1082 and 1083.

However, if this is done, there is also the problem that the radius of curvature of each relay lens becomes small and the thickness of the lens is increased and the reduction in transmittance by the absorption of the interior of the lens cannot be neglected and after all, the quantity of light is reduced.

SUMMARY OF THE INVENTION

It is the object of the present invention to provide an illuminating device and a projector in which a reduction in quantity of light is small.

A first aspect of the present invention is an illuminating device in which a light from a light source separated into three color lights differing in optical path from one another by a color separating system, and light modulating elements conforming to the respective color lights are illuminated with the color lights, wherein at least one of the optical paths of the three color lights has therein an optical system for converging and reflecting the color light passing therethrough without using any converging lens.

A second aspect of the present invention is an illuminating device in the first aspect wherein only the longest one of the three optical paths or only the remaining two optical paths except the shortest optical path have the reflecting system therein.

A third aspect of the present invention is an illuminating device in which a light from a light source is separated into three color lights differing in optical path from one another by a color separating system, and light modulating elements are illuminated with the respective color lights, wherein two of the three optical paths are equal in optical path length to each other and longer in optical path length than the remaining one optical path, and each of the two optical paths has therein an optical system for converging and reflecting the color light passing therethrough without using any converging lens.

A fourth aspect of the present invention is an illuminating device in the first, second or third aspect wherein the reflecting optical system has a plurality of concave mirrors separate from each other or connected to each other.

A fifth aspect of the present invention is an illuminating device in the first, second, third or fourth aspect wherein the reflecting optical system has a concave mirror of a shape free of axis-symmetry (non-rotational symmetry).

A sixth aspect of the present invention is an illuminating device in the first, second, third, fourth or fifth aspect wherein the mirror of the reflecting optical system is formed with a reflecting surface by dielectric material film.

A seventh aspect of the present invention is an illuminating device in any one of the first to sixth aspects wherein polarization converting means for converting the non-polarized light from the light source into a linearly polarized light polarized in a predetermined direction is provided between the light source and the color resolving system.

An eighth aspect of the present invention is a projector having the illuminating device in any one of the first, second and third aspects and a projecting device for projecting a color image by the color light from each of the light modulating elements.

A ninth aspect of the present invention is a projector in which a light from a light source is separated into three color lights differing in optical path from one another by a color separating system, image display elements for displaying images of the colors conforming to the color lights are illuminated with the color lights, the color lights from the three image display elements are combined by a dichroic prism system, and the combined color lights (images) are projected, wherein an optical path longer than the others of the optical paths of the three color lights has therein an optical system for converging and reflecting the color light passing therethrough without using any converging lens.

A tenth aspect of the present invention is a projector in which a light from a light source is separated into three color lights differing in optical path from one another by a color separating system, image display elements for displaying images of the colors conforming to the color lights are illuminated with the color lights, the color lights from the three image display elements are by a dichroic prism system, and the combined color lights (images) are projected, wherein two of the three optical paths are equal in optical path length to each other and longer in optical path length than the remaining one optical path, and each of the two optical paths has therein an optical system for converging and reflecting the color light passing therethrough without using any converging lens.

An eleventh aspect of the present invention is a projector in the aspect of the ninth or tenth aspect wherein the reflecting system has a plurality of concave mirrors separate from each other or connected to each other.

A twelfth aspect of the present invention is a projector in the ninth, tenth or eleventh aspect wherein the reflecting system has a concave mirror of a shape free of axis-symmetry (non-rotational symmetry).

A thirteenth aspect of the present invention is a projector in any one of the ninth to twelfth aspect wherein the mirror of the reflecting system has a reflecting surface of dielectric material film.

A fourteenth aspect of the present invention is a projector in any one of the ninth to thirteenth aspects wherein polarization converting means for converting a non-polarized light from the light source into a linearly polarized light polarized in a predetermined direction is provided between the light source and the color resolving system.

A fifteenth aspect of the present invention is a projector in the fourteenth aspect which has, in the optical path between the light source and the color resolving system, a reflector having a reflecting surface comprising a parabolic surface or an elliptical surface, an integrator comprising a plurality of lens arrays, and the polarization converting element.

DESCRIPTION OF THE PREFERRED EMBODIMENTS

Figure 1:
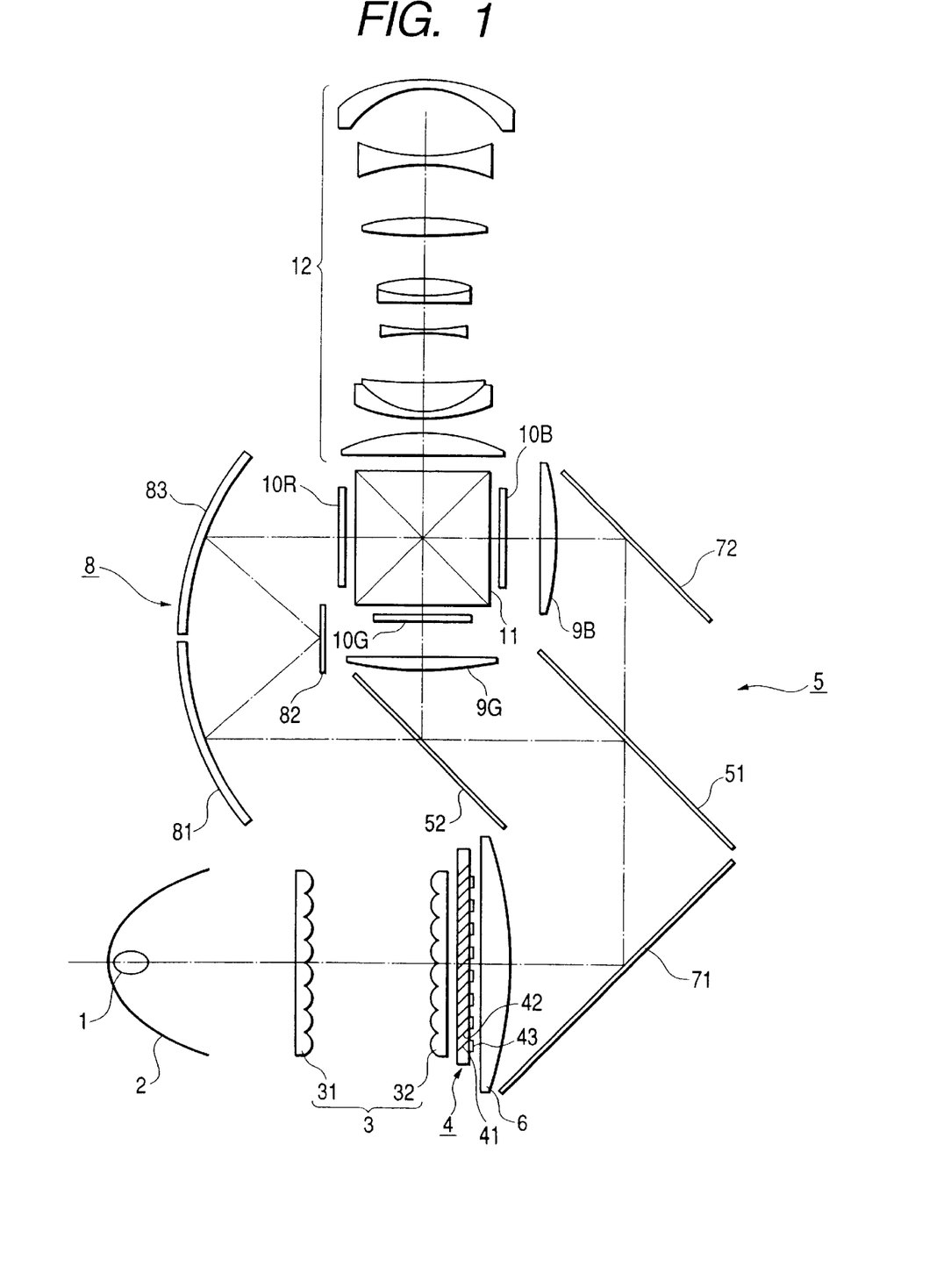
FIG. 1 is a schematic view of the essential portions of Embodiment 1 of the present invention.

FIG. 1 is a schematic view of the essential portions of Embodiment 1 of the present invention. In FIG. 1, the reference numeral 1 designates a lamp (a light source) such as a metal halide lamp or a mercury lamp. The reference numeral 2 denotes a reflector having a reflecting surface comprising a parabolic surface or an elliptical surface.

The reference numeral 3 designates an integrator comprising a first lens array 31 and a second lens array 32. The reference numeral 4 denotes a polarization converting element provided with a plurality of polarization separating surfaces 41, a plurality of reflecting surfaces 42 corresponding to the polarization separating surfaces 41, and a plurality of phase plates 43. The reference numerals 51 and 52 designate dichroic mirrors, and the reference numeral 5 denotes a color separating system having mirrors 51, 52 and 72.

The reference numerals 71 and 72 designate mirrors. The reference numeral 8 denotes a relay system having condensing mirrors 81 and 83 and a plane mirror 82 but not having any lens. The reference characters 10R, 10G and 10B designate image display elements for red, green and blue comprising liquid crystal panels. The reference numeral 11 denotes a cross dichroic prism as a color combining system in which two kinds of dichroic film surfaces cross each other at 90°.

The reference numeral 12 designates a projection lens having positive refractive power and for enlarging and projecting images displayed by the three image display elements. The reference numeral 6 denotes a condensing lens for condensing a diffused light from the polarization converting element on the three image display elements.

The reference characters 9G and 9B designate condenser lenses for condensing an illuminating light on the pupil of the projection lens 12.

The relay system 8 in the present embodiment is comprised of a reflecting optical system comprising two concave mirrors 81 and 83 and a plane mirror 82, but may be comprised of a greater number of mirrors.

Figure 8:
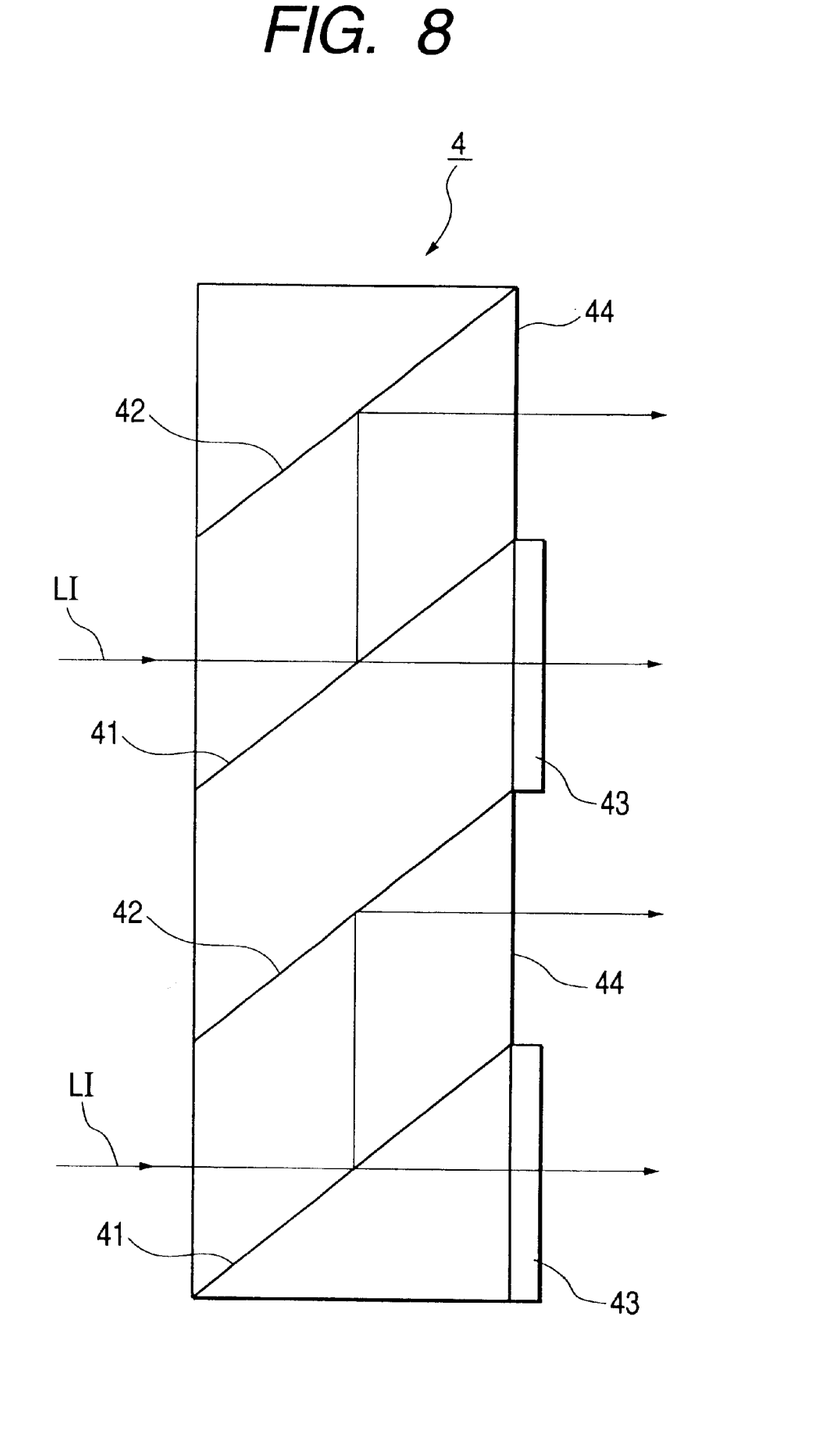
FIG. 8 is an illustration of a polarization converting element according to the present invention.

The polarization converting element 4 is such that as shown in FIG. 8, a polarization separating surface 41 provided with polarization separating film passes the P-polarized component of an incident light LI therethrough and reflects the S-polarized component of the incident light LI, and the P-polarized component passed through the polarization separating surface 41 passes through a half wavelength plate 43, has its direction of polarization converted by 90° and becomes an S-polarized light which is the same polarized light as the S-polarized component and emerges.

On the other hand, the S-polarized component reflected by the polarization separating surface 41 is reflected by a reflecting surface 42 and emerges as an S-polarized light from an exit surface 44. Thereby an incident non-polarized light is converted into the linearly polarized light of the S-polarized light and is made to emerge.

The optical path in the embodiment of FIG. 1 will now be described. A light beam which is part of the light from the light source 1 directly enters the first lens array 31, and the other light beam is reflected by the reflector 2 and enters the first lens array 31.

The first lens array 31 forms a plurality of secondary light source images near the second lens array 32 by the light from the light source.

The lights from the plurality of secondary light source images near the second lens array 32 enter the polarization converting element 4, and enters the condensing lens 6 from the polarization converting element 4 as a linearly polarized light beam (polarized to the dichroic mirrors 51 and 52) uniformized in the direction of polarization.

The light beams from the plurality of secondary light source images converted into S-polarized lights by the element 4 illuminate the three image display elements 10B, 10G and 10R as surfaces to be illuminated through the condensing lens 6, the condenser lenses 9B, 9G and the relay system 8 in superposed relationship with one another. Thus, each element 10 is uniformly illuminated by the linearly polarized light.

On the other hand, viewing from the viewpoint of color resolution, the white light from the condensing lens 6 is reflected by a mirror 71 and enters the dichroic mirror 51. The blue light transmitted through the dichroic mirror 51 is reflected by the mirror 72, is condensed by the condenser lens 9B and illuminates the image display element 10B for blue.

Of the green light and red light reflected by the dichroic mirror 51, the green light is reflected by the dichroic mirror 52 and the red light is transmitted through the dichroic mirror 52.

The green light reflected by the dichroic mirror 52 is condensed by the condenser lens 9G and illuminates the image display element 10G for green.

The red light transmitted through the dichroic mirror 52 is condensed by the relay system 8 which has not any con-verging lens and illuminates the image display element 10R for red. The color lights (images) from the image display elements 10B, 10G and 10R are combined by the cross dichroic prism 11, and are enlarged and projected onto a predetermined surface by the projection lens 12.

Figure 2:
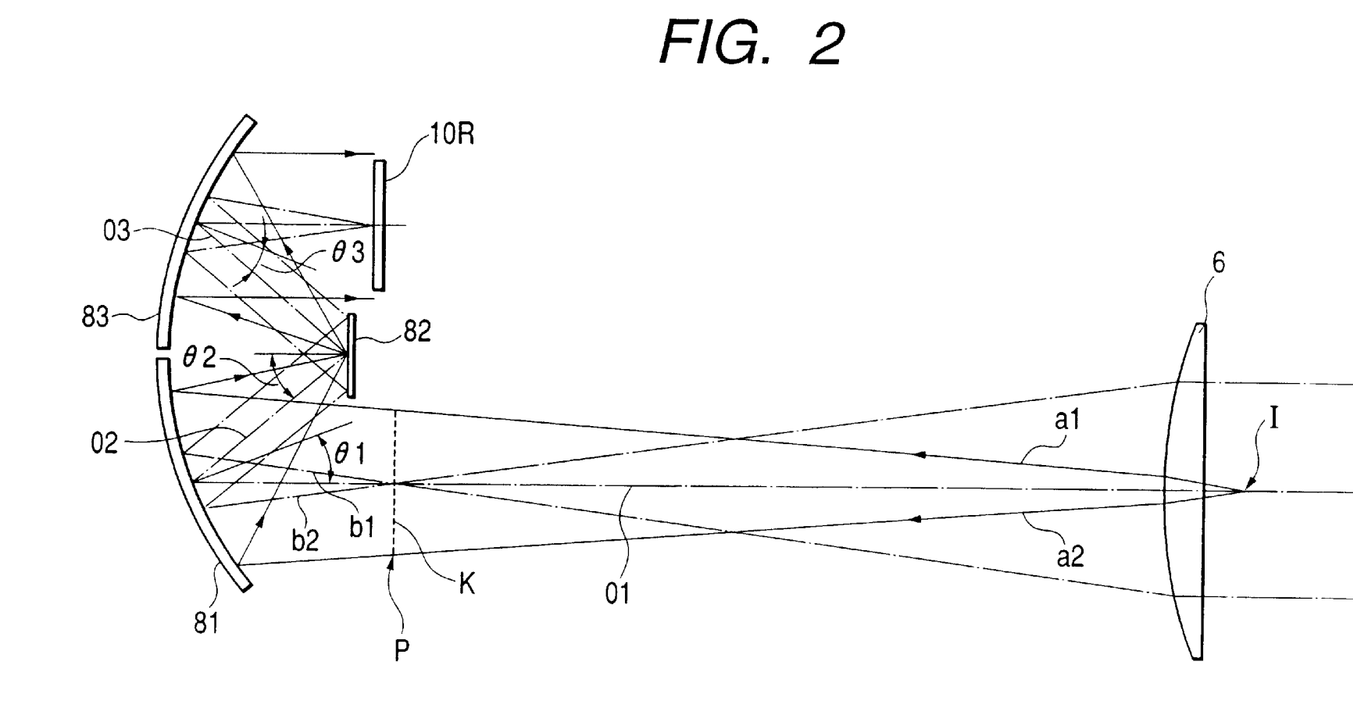
FIG. 2 shows an optical path when the optical path of a portion of FIG. 1 is developed.

FIG. 2 is an optical path illustration in which the optical path of the red light leading from the condensing lens 6 of FIG. 1 to the relay system 8 is developed. In FIG. 2, the members 71, 51 and 52 disposed in the optical path from the condensing lens 6 to the concave mirror 81 of the relay system 8 depicted in FIG. 1 are omitted.

The optical action of the relay system 8 will now be described with reference to FIG. 2. A first uniform illuminating area K is produced on the imaging plane P of a parallel light beam incident on the condensing lens 6, and the flux of rays of light (a1 and a2) from the imaging point (secondary light source image) I of the light source 1 by the integrator 3 passes through the plane P on which the first uniform illuminating area K is produced in its divergent state, and further diverges and is incident on the first relay mirror 81. The first relay mirror 81 converges this flux of rays of light (a1 and a2) and images it near the second relay mirror 82.

Therefore, the first relay mirror 81 is comprised of a concave mirror disposed with its optical axis inclined at a predetermined angle θ1 with respect to the optical axis 01 of the condensing lens 6.

The second relay mirror 82 is disposed with its optical axis (perpendicular) inclined at a predetermined angle θ2 with respect to an optical axis 02 bent by the first relay mirror 81, and directs the light from the first relay mirror 81 to the third relay mirror 83.

The light which has re-imaged the secondary light source image near the second relay mirror 82 diverges and is incident on the third relay mirror 83. The third relay mirror 83 makes this divergent light into a substantially parallel light and causes it to enter the image display element 10R.

Therefore, the third relay mirror 83 is disposed with its optical axis inclined at a predetermined angle θ3 with respect to an optical axis 03 bent by the second relay mirror 82, and is comprised of a concave mirror.

The relay mirrors 81, 82 and 83 are disposed so that the first uniform illuminating area K and the image display element 10R may be in substantially optically-conjugate relationship with each other and therefore, a flux of rays of light (b1 and b2) having the first uniform illuminating area K as an object plane P is condensed (imaged) on an imaging plane near the image display element 10R by the action of the relay mirrors 81, 82 and 83.

Reflection increasing film is formed on the surfaces of the relay mirrors 81, 82 and 83 and in the present embodiment, this film is comprised of dichroic film which exhibits a high reflectance particularly to red light longest in the optical path from the light source which has been extracted by the color resolving system 5.

As described above, in the present embodiment, the relay system 8 having at least two concave mirrors 81 and 83 is provided in one (R optical path) of the three illuminating optical paths which is longest in the optical path length, whereby in spite of a compact construction, there is no loss of the quantity of light by the interval absorption of the relay system 8, and the image display elements are uniformly illuminated.

Also, the mirrors 81, 82 and 83 constituting the relay system are made into mirrors comprising dielectric material multilayer film provided on a transparent substrate, whereby absorption becomes null and a higher reflectance is obtained.

Further, the shape of at least one of the plurality of mirrors constituting the relay system is made into an aspherical shape free of axis-symmetry, whereby aberrations created in the relay system can be further reduced and an illuminating area of high uniformity can be produced.

Figure 3:
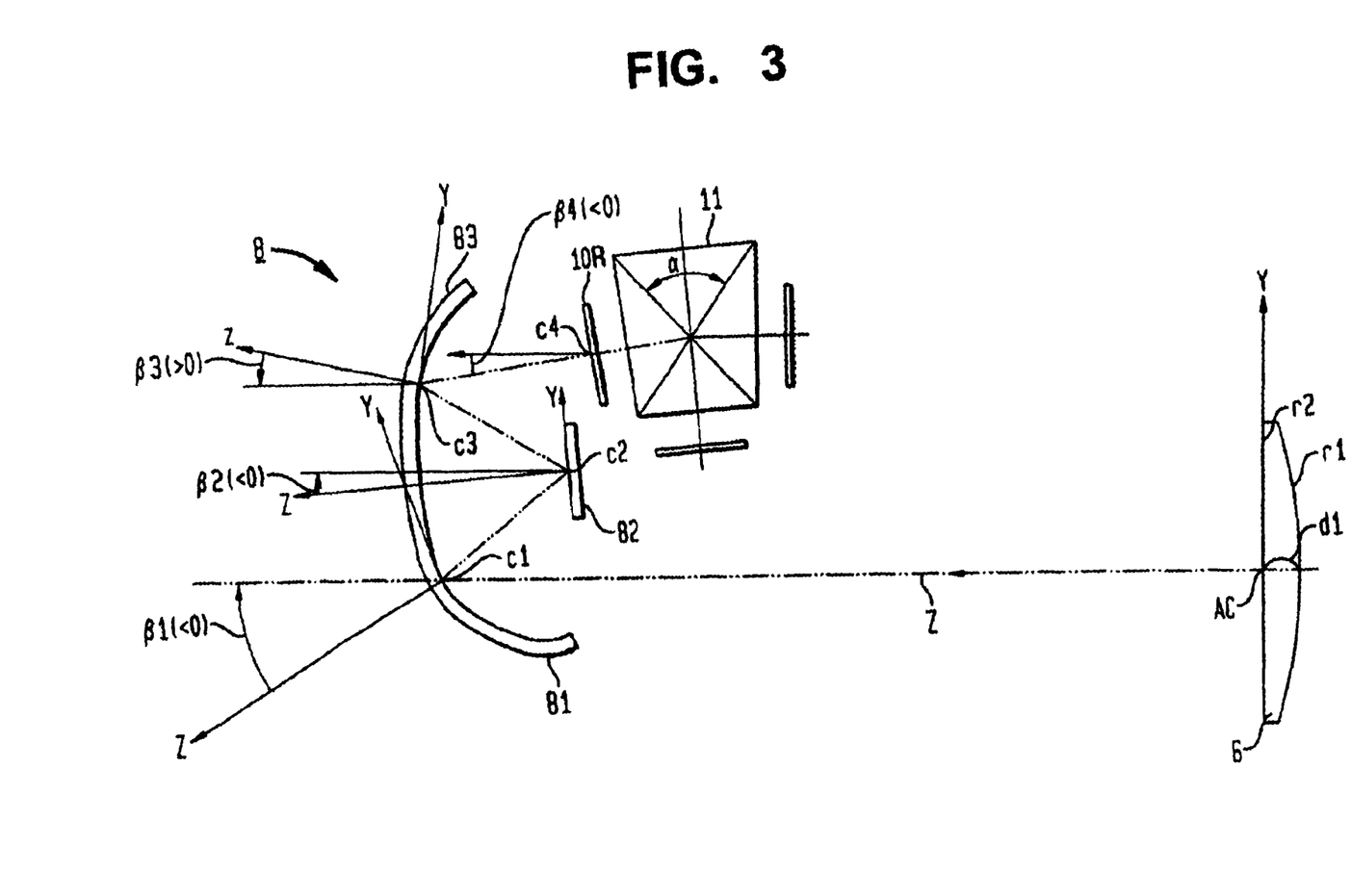
FIG. 3 is a schematic view of the essential portions of Embodiment 2 of the present invention.

FIG. 3 is a schematic view of the essential portions of a relay system in Embodiment 2 of the present invention. In FIG. 3, a portion of the Embodiment 1 of FIG. 1 is changed, and FIG. 3 shows a layout view of the relay system 8 when the angle α formed by the crossing dichroic film of a dichroic prism 11 as a color combining system is 86° and the second relay mirror 82 is a plane mirror.

In the present embodiment, the reflecting surfaces of the first and third relay mirrors 81 and 83 are aspherical surfaces free of axis-symmetry (non-rotational symmetry), and by the effect of these two aspherical surfaces, the parallelism (a degree of collimation; "heikoudo in Japanese") of the illuminating light emerging from the third relay mirror 83 to the image display element 10R is improved and further, the uniformity of the illumination on the image display element 10R is improved.

The optical data of the relay system of such a construction are shown in Table 1 below. The shape of the reflecting surface of each mirror (hereinafter referred to as the "mirror surface") is represented by the functional expression that $$Z = \frac{\frac{X^2 + Y^2}{R}}{1 + \sqrt{1 - \frac{x^2 + y^2}{R^2}}} + \sum_{n,m} D_{nm} x^n y^m \quad (1)$$

and the origin of this function is a local origin (c1, c2, c3) on the mirror surface. The absolute positions of the origin of each mirror surface and the center c4 of the image display element are represented by (X, Y, Z) as the absolute coordinates in which the exit side lens surface of the condensing lens 6 is the origin AC. The radius of curvature is such that an axially convex shape is positive.

TABLE 1 condensing lens 6
r1 = 101.873, r2 = ∞, d1 = 7.5
refractive index 1.6584, abbe number 50.9
mirror 81
X = 0, Y = 0, Z = +182.26
β1 = −19 deg
r = −56.07
D20 = +1.2086e-3, D02 = +1.8973e-3, D03 = −4.0523e-6
D22 = +1.3868e-6, D04 = +7.5542e-7, D41 = +1.8558e-7
D23 = −3.8801e-8, D05 = +5.2008e-8
mirror 82
X = 0, Y = +22.54, Z = +153.41
β2 = −4 deg
r = ∞ (plane)
mirror 83
X = 0, Y = +40.63, Z = +184.76
β3 = +11 deg
r = −74.30
D20 = −1.119e-3, D02 = −2.8417e-4, D03 = +1.1919e-6
D22 = +5.5084e-7, D04 = −1.2435e-7, D41 = −1.5635e-7
D23 = +4.0856e-8, D05 = −1.0824e-08
panel surface
X = 0, Y = +45.8, Z = +148
β4 = −8 deg If as described above, the positions of the aspherical surfaces of the relay mirrors 81 and 83 free of axis-symmetry in Z direction are set so as to become substantially the same, when the relay mirrors 81 and 83 are to be actually manufactured, they can be worked as a molded part in which the two mirrors are connected together as shown, and the simplification of the entire device can be achieved.

Figure 4:
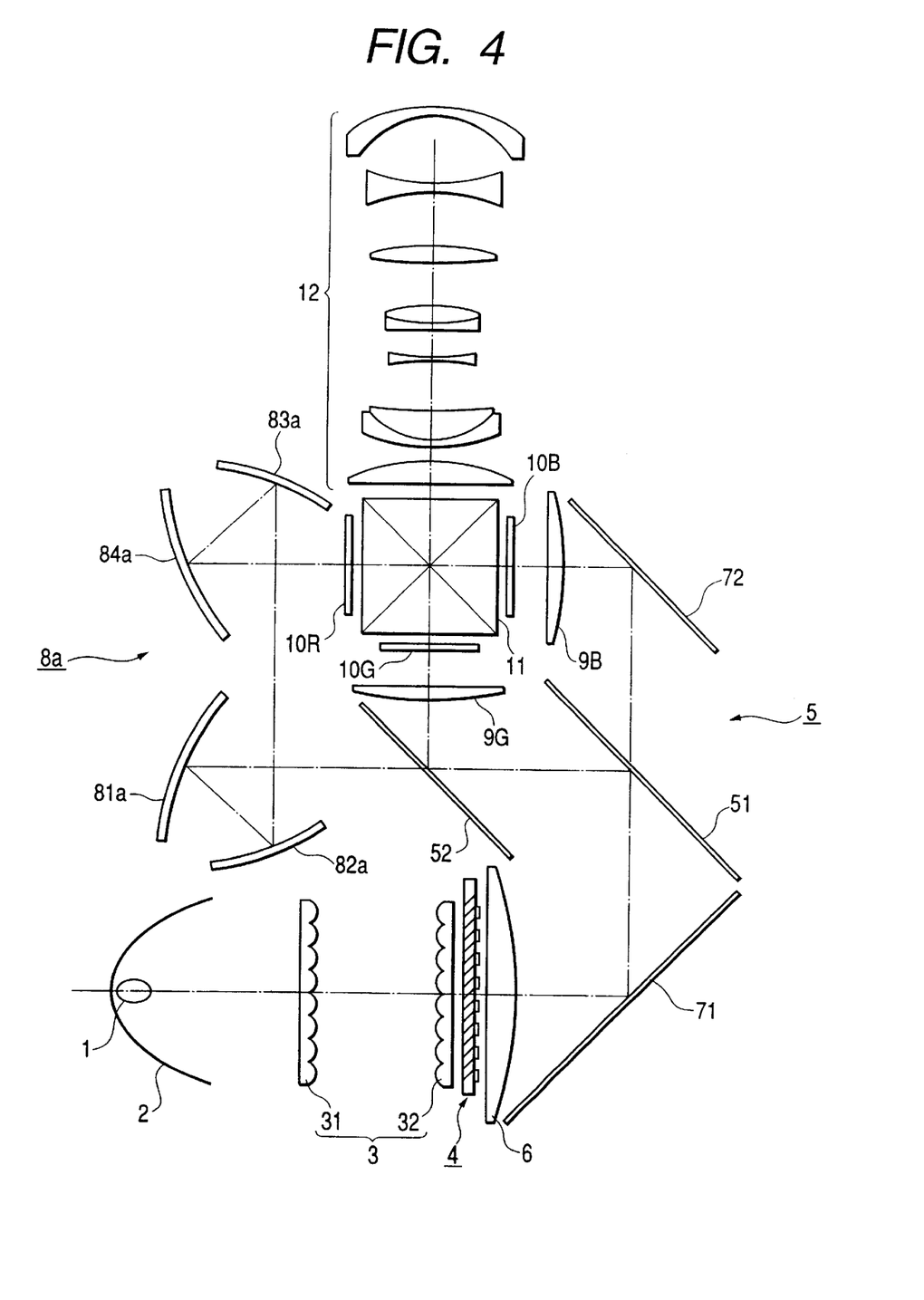
FIG. 4 is a schematic view of the essential portions of Embodiment 3 of the present invention.

FIG. 4 is a schematic view of the essential portions of Embodiment 3 of the present invention. This embodiment is basically the same as the Embodiment 1 of FIG. 1 except for a relay system 8a. Herein, the relay system 8a is comprised of a reflecting optical system comprising four concave mirrors 81a, 82a, 83a and 84a.

Figure 5:
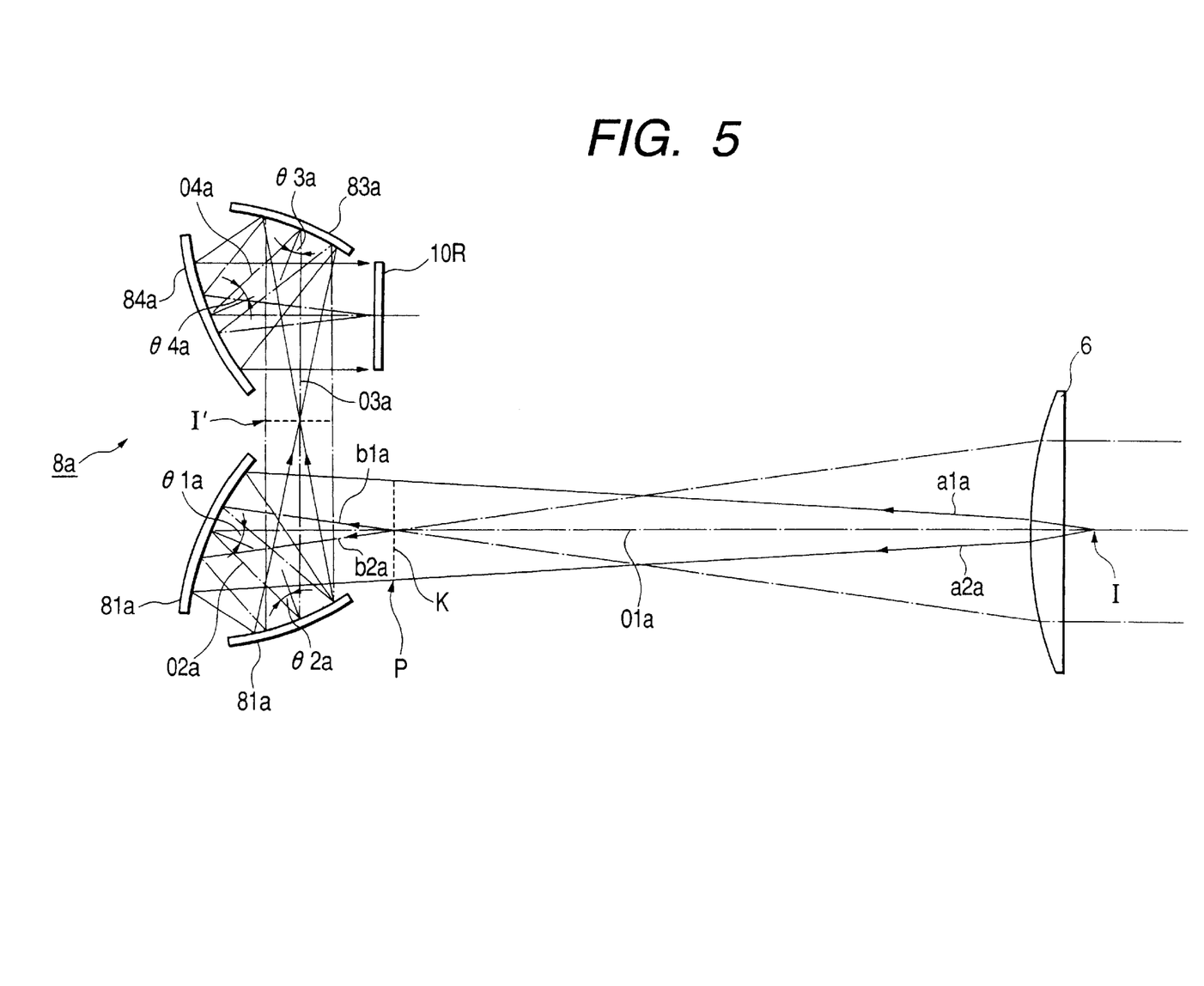
FIG. 5 shows an optical path when the optical path of a portion of FIG. 4 is developed.

FIG. 5 is an optical path illustration in which an optical path leading from the condensing lens 6 of FIG. 4 to the relay system 8a is developed. In FIG. 5, the elements 71, 51 and 52 disposed in the optical path from the condensing lens 6 to the relay system 8a depicted in FIG. 4 are omitted.

The optical action of the relay system 8a will now be described with reference to FIG. 5. A first uniform illuminating area K is produced on the imaging plane P of the condensing lens 6, and the flux of rays of light (a1a and a2a) from the secondary light source image I of the light source 1 by the integrator 3 passes through the plane P on which the first uniform illuminating area K is produced in its divergent state, and further diverges and is reflected by first and second relay mirrors 81a and 82a in the named order. The relay mirrors 81a and 82a converge this flux of rays of light a1a and a2a and images it at a position I' between the second relay mirror 82a and a third relay mirror 83a.

Therefore, the first relay mirror 81a is comprised of a concave mirror disposed with its optical axis inclined at a predetermined angle θ1a with respect to the optical axis 01a of the condensing lens 6. Also, the second relay mirror 82a is comprised of a concave mirror disposed with its optical axis inclined at an angle θ2a with respect to an optical axis 02a bent by the mirror 81a. The third relay mirror 83a and a fourth relay mirror 84a reflect the divergent light from the position I' in the named order, and cause the light to enter the image display element 10R as a substantially parallel light.

Therefore, the third relay mirror 83a is comprised of a concave mirror disposed with its optical axis inclined at a predetermined angle θ3a with respect to an optical axis 03a bent by the second relay mirror 82a, and the fourth relay mirror 84a is comprised of a concave mirror disposed with its optical axis inclined at a predetermined angle θ4a with respect to an optical axis 04a bent by the third mirror 83a.

The relay mirrors 81a, 82a, 83a and 84a are disposed so that the first uniform illuminating area K and the image display element 10R may be in substantially optically-conjugate relationship with each other and therefore, the flux of rays of light (b1a and b2a) having the first uniform illuminating area K as an object plane P is condensed (imaged) on an imaging plane near the image display element 10R by the action of the rays mirrors 81a, 82a, 83a and 84a.

Figure 6:
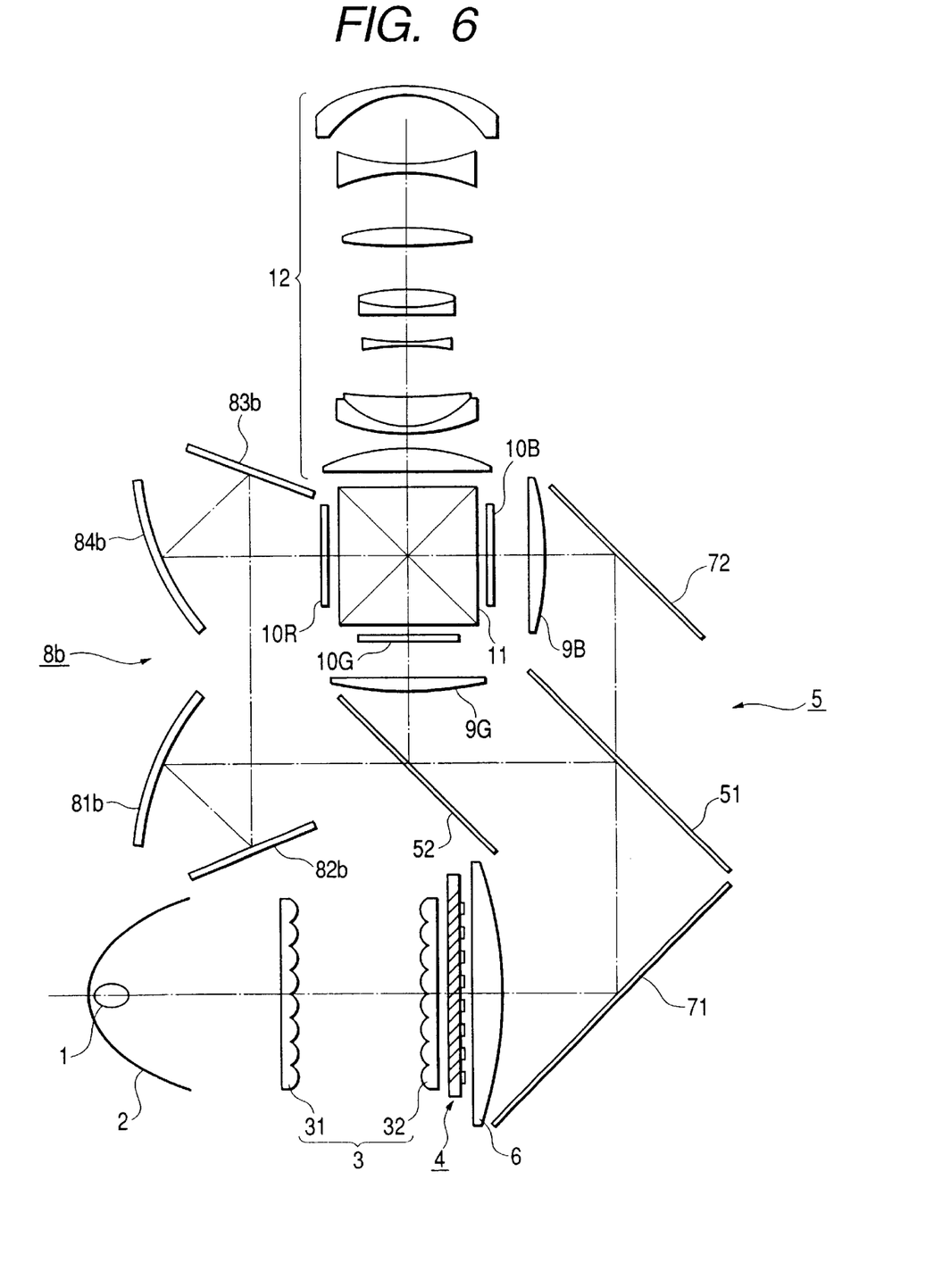
FIG. 6 is a schematic view of the essential portions of Embodiment 4 of the present invention.

FIG. 6 is a schematic view of the essential portions of Embodiment 4 of the present invention. This Embodiment 4 differs from the Embodiment 3 of FIG. 4 in that first and fourth relay mirrors 81b and 84b are made into concave mirrors and second and third relay mirrors 82b and 83b are made into plane mirrors to thereby totally facilitate the working of the mirrors, and in the other points, the construction of the present embodiment is the same as that of Embodiment 3.

Figure 7:
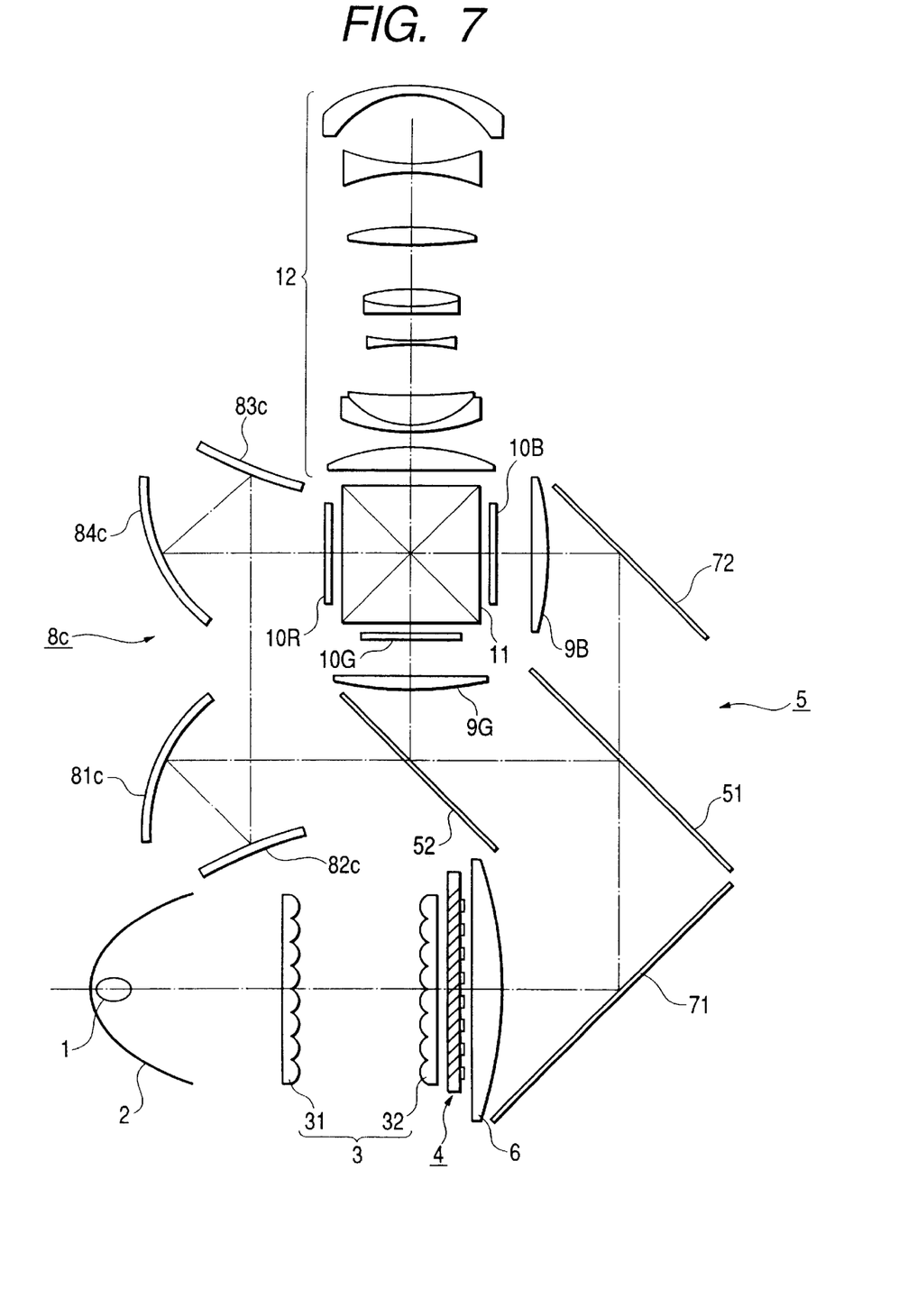
FIG. 7 is a schematic view of the essential portions of Embodiment 4 of the present invention.

FIG. 7 is a schematic view of the essential portions of Embodiment 5 of the present invention. This Embodiment 5 differs from the Embodiment 3 of FIG. 4 in that first and fourth relay mirrors 81c and 84c are made into concave mirrors and second and third relay mirrors 82c and 83*3* are made into convex mirrors, whereby curvature of image field can be corrected well, and in the other points, the construction of the present embodiment is the same as that of Embodiment 3.

According to the above-described illuminating device and projector, an image display element such as a liquid crystal panel farthest from a light source can be illuminated with small loss of the quantity of light and with a uniform illuminance distribution to project an image formed thereby similarly to other images.

While the embodiments described above are ones in which the color separating system defines two short optical paths equal in optical path length to each other and an optical path longer in optical path length than these, there is also an aspect in which the color separating system defines two long optical paths equal in optical path length to each other and two optical paths shorter in optical path length than these and a reflecting system of positive power having the condensing function is applied to the two long optical paths. Also, mirrors of a flat diffraction grating type can be used instead of the concave mirrors and the convex mirrors.

In the foregoing embodiments, the cross dichroic prism as the color combining means may be replaced with two dichroic mirrors crossly arranged, a dichroic prism in which a plurality of prisms are combined as disclosed in Japanese Patent No. 2,505,758, or the like.

What is claimed is:

1. An illuminating device, comprising:
    a color separating system for separating light from a light source into three color lights having different optical paths one another; and
    an optical system for illuminating three modulating elements respectively corresponding to said three color lights by said three color lights,
    wherein when assuming the three optical paths along which said three color lights travel as a first optical path, a second optical path and a third optical path respectively, said first optical path is longer than said second optical path and third optical path, and two concave mirrors are provided only in said first optical path.

2. The illuminating device according to claim 1, wherein said second optical path and third optical path have substantially equal length.

3. The illuminating device according to claim 1, wherein said two concave mirrors are separated from each other.

4. The illuminating device according to claim 1, wherein said two concave mirrors are connected to each other.

5. The illuminating device according to claim 1, wherein each of said two concave mirrors has a shape having non-rotational symmetry.

6. The illuminating device according to claim 1, wherein each of said two concave mirrors has an aspherical surface of a shape having non-rotational symmetry.

7. The illuminating device according to claim 1, wherein two concave mirrors and one plane mirror are provided in said first optical path.

8. A projector comprising;
    an illuminating device according to claim 1, for illuminating said three modulating elements by the light from the light source,
    wherein the lights from said three modulating elements are synthesized and directed to a projected plane.

9. An illuminating device comprising:
    a color separating system for separating light from a light source into three color lights; and
    an optical system for illuminating three modulating elements respectively corresponding to said three color lights by said three color lights, wherein a plurality of mirrors are located between said color separating system and said modulating element both on at least one of optical paths of said three color lights, and at least one of said plurality of mirrors is a convex mirror.

10. The illuminating device according to claim 9, wherein said at least one optical path is longest among said three optical paths.

11. The illuminating device according to claim 9, wherein said at least one optical path is two optical paths excluding one optical path which is shortest among said three optical paths.

12. The illuminating device according to claim 9, wherein a plurality of convex mirrors are provided in said at least one optical path.

13. The illuminating device according to claim 9, wherein two convex mirrors are provided in said at least one optical path.

14. The illuminating device according to claim 9, wherein said convex mirror has a shape having non-rotational symmetry.

15. The illuminating device according to claim 9, wherein said convex mirror has an aspherical surface of a shape having non-rotational symmetry.

16. The illuminating device according to claim 9, wherein two convex mirrors and two concave mirrors are provided in said at least one optical path.

17. A projector comprising:
    an illuminating device according to claim 9, for illuminating said three modulating elements by the light from the light source,
    wherein the lights from said three modulating elements are synthesized and directed to a projected plane.

18. An illuminating device comprising:
    a color separating system for separating light from a light source into three color lights; and
    an optical system for illuminating three modulating elements respectively corresponding to said three color lights by said three color lights,
    wherein when said three optical paths of said three color lights are respectively defined as a first optical path, a second optical path, and a third optical path, said first optical path is longer than said second and third optical paths, a plurality of mirrors are located between said color separating system and said modulating element on said first optical path, and at least one of said plurality of mirrors is a concave mirror.

19. A device according to claim 18, wherein said second optical path and third optical path have substantially equal length.

20. A device according to claim 18, wherein three mirrors are provided in the light path between said color separating system and said modulating element on said first optical path among said three modulating elements.

21. A device according to claim 18, wherein two concave mirrors are provided in the light path between said color separating system and said modulating element on said first optical path among said three modulating elements.

22. A projector comprising:
    an illuminating device according to claim 18, for illuminating said three modulating elements by the light from the light source,
    wherein the light from said three modulating elements are synthesized and directed to a projected plane.

23. An illuminating device comprising:
    a color separating system for separating light from a light source into three color lights; and
    an optical system for illuminating three modulating elements respectively corresponding to said three color lights by said three color lights,
    wherein a plurality of mirrors are located between said color separating system and said modulating element both on at least one of optical paths of said three color lights, and at least one of said plurality of mirrors is a concave mirror.

* * * * *

UNITED STATES PATENT AND TRADEMARK OFFICE
CERTIFICATE OF CORRECTION

PATENT NO. : 6,634,755 B1
DATED : October 21, 2003
INVENTOR(S) : Atsushi Okuyama et al.

It is certified that error appears in the above-identified patent and that said Letters Patent is hereby corrected as shown below:

Title page,
Item [56], References Cited, U.S. PATENT DOCUMENTS, replace
"5,626,409 A * 5/1997 Nakayama et al." with
-- 5,626,409 A * 5/1997 Nakayama et al .... 353/31 --

Signed and Sealed this

Fifth Day of April, 2005

JON W. DUDAS
*Director of the United States Patent and Trademark Office*